United States Patent
Knoblauch

(10) Patent No.: US 9,221,334 B2
(45) Date of Patent: Dec. 29, 2015

(54) DRIVE TRAIN OF A SOLELY ELECTRICALLY DRIVEN MOTOR VEHICLE HAVING TWO ELECTRIC MOTORS

(71) Applicant: Dr. Ing. h.c. F. Porsche Aktiengesellschaft, Stuttgart (DE)

(72) Inventor: Daniel Knoblauch, Obergruppenbach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/368,069

(22) PCT Filed: Nov. 27, 2012

(86) PCT No.: PCT/EP2012/004887
§ 371 (c)(1),
(2) Date: Jun. 23, 2014

(87) PCT Pub. No.: WO2013/091763
PCT Pub. Date: Jun. 27, 2013

(65) Prior Publication Data
US 2014/0371016 A1 Dec. 18, 2014

(30) Foreign Application Priority Data
Dec. 22, 2011 (DE) .................. 10 2011 056 929

(51) Int. Cl.
*F16H 48/20* (2012.01)
*B60K 17/12* (2006.01)
(Continued)

(52) U.S. Cl.
CPC . *B60K 17/12* (2013.01); *B60K 1/02* (2013.01); *B60K 17/02* (2013.01); *B60K 17/16* (2013.01); *B60L 15/2036* (2013.01);
(Continued)

(58) Field of Classification Search
CPC .................. B60K 1/02; F16H 48/20
See application file for complete search history.

(56) References Cited

U.S. PATENT DOCUMENTS

| | | | |
|---|---|---|---|
| 5,419,406 | A | 5/1995 | Kawamoto et al. |
| 6,615,946 | B2 | 9/2003 | Pasquini et al. |
| 2011/0259657 | A1* | 10/2011 | Fuechtner .................. 180/65.21 |

FOREIGN PATENT DOCUMENTS

| | | |
|---|---|---|
| DE | 102006028790 | 1/2008 |
| DE | 102010005789 | 7/2011 |

(Continued)

OTHER PUBLICATIONS

International Search Report dated Mar. 6, 2013.
(Continued)

*Primary Examiner* — Derek D Knight
(74) *Attorney, Agent, or Firm* — Gerald E. Hespos; Michael J. Porco; Matthew T. Hespos

(57) ABSTRACT

A drive train (1) of a solely electrically driven motor has an axle (2) with first and second axle sections (4, 5) connected to different outputs of a differential (35). The drive train also has a first and second electric motors (13, 14) that co-operate with first and second transmissions (15) respectively to drive the axle (2). A first clutch can connect the first transmission (15) to an entry wheel (34) of the differential (35) for driving the two axle sections (4, 5) of the axle (2). A second clutch (37) can connect the first transmission (15) to the first axle section (4) while the first clutch (36) is open and a third clutch (38) can connect the second transmission (16) to a second axle section (5) while the first clutch (36) is open.

10 Claims, 1 Drawing Sheet

(51) Int. Cl.
  *B60K 1/02*   (2006.01)
  *B60K 17/02*  (2006.01)
  *B60K 17/16*  (2006.01)
  *B60L 15/20*  (2006.01)
  *B60K 1/00*   (2006.01)

(52) U.S. Cl.
  CPC ...... *B60L 15/2054* (2013.01); *B60K 2001/001* (2013.01); *B60L 2240/421* (2013.01); *B60L 2240/423* (2013.01); *B60L 2240/486* (2013.01); *B60L 2240/507* (2013.01)

(56) References Cited

FOREIGN PATENT DOCUMENTS

| | | | |
|---|---|---|---|
| DE | 102010005789 A1 * | 7/2011 | ............... B60K 1/02 |
| JP | 11240349 | 9/1999 | |

OTHER PUBLICATIONS

German Search Report dated Sep. 10, 2011.

* cited by examiner

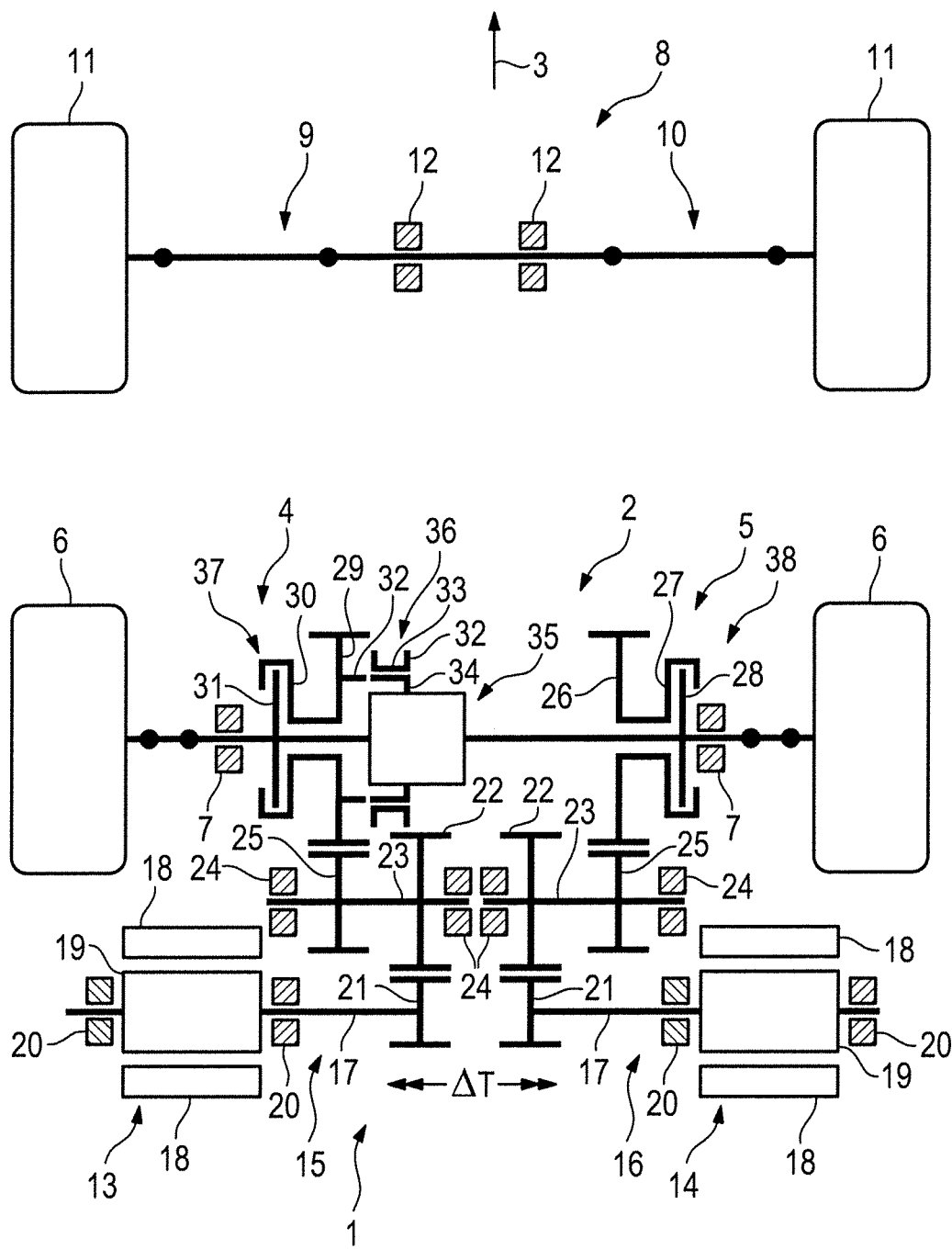

DRIVE TRAIN OF A SOLELY ELECTRICALLY DRIVEN MOTOR VEHICLE HAVING TWO ELECTRIC MOTORS

BACKGROUND

1. Field of the Invention

The invention relates to a drive train of a solely electrically drivable motor vehicle, having an axle which has a differential, and two electric machines, wherein the axle is drivable by means of the electric machines via at least one gearing.

2. Description of the Related Art

Such a drive train, which is used for an electrically drivable earth-moving vehicle or for an agricultural vehicle with four-wheel drive, is known from DE 600 13 340 T2. Said drive train has two electric machines which are arranged above the rear axle of the motor vehicle in the direction of travel and interact with a spur gearing which is arranged in front of the rear axle. The gearing is connected via one shaft or two shafts to the differentials which are assigned to the two axles, therefore to the rear axle and to the front axle of the motor vehicle.

It is the object of the present invention to provide a drive train in a motor vehicle to be operated solely electrically, which drive train makes it possible to drive in different driving situations with particularly good efficiency.

SUMMARY OF THE INVENTION

The drive train of the solely electrically drivable motor vehicle therefore has two electric machines. One of the two electric machines, referred to below as the first electric machine, interacts with a first gearing, and the other of the two electric machines, referred to below as the second electric machine, interacts with a second gearing. The first gearing is connectable via a first switchable clutch to an input gear of the differential, for driving two axle sections of the axle, which axle sections are connected to different outputs of the differential. The first gearing is connectable via a second clutch to a first axle section of the axle when the first clutch is open, and the second gearing is connectable via a third clutch to a second axle section of the axle when the first clutch is open.

This configuration of the drive train with the two electric machines, the two gearings assigned to the latter and the three clutches makes it possible either to drive the two axle sections of the axle by driving only the first electric machine via the first gearing assigned thereto and the differential assigned to said gearing, or else not to introduce the driving force into the differential and, instead, to drive each axle section directly by means of the electric machine assigned thereto. This independent drive of the respective axle section of the axle permits an individual wheel drive of the motor vehicle wheel assigned to the respective axle section and of the running wheel of the motor vehicle. As a result, a torque vectoring of the axle sections of the axle or of the wheels of the axle is possible. Said torque vectoring does not cause any loss due to a braking engagement on the axle section of the one or other wheel.

In the driving mode, in which force is transmitted via the differential, only the one electric machine—the first electric machine—is operated, when the first clutch is closed, while the two other clutches—the second and third clutches—are open. By contrast, in individual wheel drive, the first clutch is open and the second and third clutches are closed.

The driving of the motor vehicle only by the one electric machine—the first electric machine—is advantageous if driving situations depending on low energy consumption are to prevail. In particular whenever critical driving situations in terms of driving dynamics are to prevail, the switch is made to the individual wheel drive. Said critical driving situations in terms of driving dynamics are, in particular, those which are critical under safety aspects and a stabilizing intervention on the vehicle is required.

The two electric machines and the three clutches preferably have control means, by means of which, when the first electric machine is in operation, the first clutch is closed and the second and third clutches are open, or, when the electric machines are in operation, the first clutch is open and the second and third clutches are closed.

The gearings are preferably designed as spur gearings. They can be accommodated in the relatively small construction space. In particular, the gearings have identical transmission ratios.

The electric machines are arranged in particular transversely with respect to the direction of travel of the motor vehicle.

The drive train is preferably used in a motor vehicle which is in the form of a passenger vehicle. Said passenger vehicle is in particular a sports car. Said motor vehicle, in particular the passenger vehicle or the sports car, is preferably in the form of a rear drive. The two electric machines are therefore arranged in the rear region of the motor vehicle or of the drive train. It is considered to be particularly advantageous if the two electric machines are arranged behind the rear axle.

In principle, however, the motor vehicle can be in the form of a front drive.

The wheels assigned to the drive train are suspended in particular individually via propeller shafts. The drive train therefore does not have a rigid axle.

Further features of the invention emerge from the dependent claims, the attached drawing and the description of the preferred exemplary embodiment, which is reproduced in the drawing, without being limited thereto.

BRIEF DESCRIPTION OF THE DRAWING

FIG. 1 shows a schematic diagram of a preferred embodiment of the drive train according to the invention.

DETAILED DESCRIPTION OF THE PREFERRED EMBODIMENTS

The exemplary embodiment according to FIG. 1 illustrates a drive train for a solely electrically drivable motor vehicle, which is in particular a passenger vehicle, specifically a sports car. The rear axle of the drive train assigned to the motor vehicle and, furthermore, a non-driven front axle of the motor vehicle is shown.

The drive train 1 with individual wheel suspension has the first, rear axle 2. With respect to the forward direction of travel 3 of the motor vehicle, referred to below as direction of travel, the rear axle 2 has a left axle section 4 and a right axle section 5. The left and the right wheel of the rear axle 2 are denoted by the reference number 6, and bearings for the axle sections 4 and 5 of the rear axle 2 are denoted by the reference number 7. The axle sections 4 and 5 of the rear axle 2 have propeller shafts.

The motor vehicle furthermore has a second, front axle 8 which is not driven. This axle 8 also has individual wheel suspension. The front axle 8 has a left axle section 9 and a right axle section 10. The left and right wheel of the front axle 8 are denoted by the reference number 11, and the bearings for the axle sections 9 and 10 of the front axle 8 are denoted by the reference number 12. The axle sections 9 and 10 of the front axle 8 likewise have propeller shafts.

The rear axle 2 is drivable by means of two electric machines 13 and 14. In this case, the electric machine 13 interacts with a gearing 15 and the electric machine 14 interacts with a gearing 16. The gearings 15 and 16 are arranged substantially behind the rear axle 2, and the two electric machines 13 and 14 are each arranged transversely with respect to the direction of travel 3. The axis of rotation of the respective electric machine 13 or 14, illustrated by the driven shaft 17 thereof, is therefore arranged in the direction of travel 3.

The stator of the respective electric machine 13 or 14 is denoted by the reference number 18, and the rotor of the respective electric machine 13 or 14, to which rotor the driven shaft 17 is connected, is denoted by the reference number 19. The respective driven shaft 17 is mounted in bearings 20.

The driven shafts 17 of the two electric machines 13, 14 are arranged on the same geometrical axis, and therefore the axis of rotation of the stators 18 of the electric machines 13 and 14 corresponds to said geometrical axis.

Apart from the minor difference still to be described below, the two gearings 15, 16 are arranged mirror-symmetrically with respect to the longitudinal axis of the vehicle and are of identical design. They therefore have identical transmission ratios. The gearings are designed as spur gearings.

The respective gearing 15 or 16 has a pinion 21 which is connected to the driven shaft 17 for rotation therewith and is designed as a spur gear. Said pinion 21 meshes with a spur gear 22 of the respective gearing 15 or 16, which spur gear is connected to a shaft 23 for rotation therewith. Said shaft is mounted on the end sides in bearings 24. A pinion 25 is arranged next to the spur gear 22 and is connected to the shaft 23 for rotation therewith. The pinion 25 of the gearing 16 meshes with a spur gear 26 which is mounted in a freely rotatable manner in the right axle section 5 of the axle 2. The spur gear 26 is connected to a clutch part 27 for rotation therewith, which clutch part can be brought into an operative position with a clutch part 28 which is connected to the right axle section 5 for rotation therewith.

A spur gear 29 which is modified in relation to the spur gear 26 interacts with the pinion 25 of the other gearing 15. In the same manner as the spur gear 26, said spur gear 29 is mounted in a freely rotatable manner in the axle section of the axle 2, in the present case the left axle section 4, and is connected to a clutch part 30, which is designed in a manner corresponding to the clutch part 27, for rotation therewith. Said clutch part 30 can be brought into an operative position with a clutch part 31 which is connected to the left axle section 4 for rotation therewith and in this respect corresponds to the clutch part 28 with regard to construction and arrangement.

The spur gear 29 which is assigned to the left axle section 4 basically differs from the spur gear 26 which is assigned to the right axle section 5 in that the spur gear 29 non-rotatably receives a clutch part 32. The latter can be brought into operative connection with a clutch part 33, which is switchable and with the aid of which a non-rotatable connection can be produced between the spur gear 29 and an input gear 34 of a differential 35. The two axle sections 4 and 5 are connected to two outputs of the differential 35 for rotation therewith.

Accordingly, the clutch parts 32 and 33 form a first switchable clutch 36, the clutch parts 30 and 31 form a second switchable clutch 37, and the clutch parts 27 and 28 form a third switchable clutch 38. In a first driving situation, in which it suffices to drive the vehicle by means of one of the two electric machines, specifically the electric machine 13, and in which an energy-saving driving manner occurs, the first clutch 36 is closed and the second and third clutches 37, 38 are open. The electric machine 14 is switched off. Accordingly, only the electric machine 13 transmits the torque via the gearing 15, and accordingly, the spur gear 29 and the clutch 36 to the differential 35 and from there via the two axle sections 4 and 5 to the wheels 6.

If, by contrast, a critical situation in terms of driving dynamics prevails, the wheels 6 of the rear axle 2 can be driven individually. The first clutch 36 is open and the second and third clutches 37, 38 are closed. In this case, force is not transmitted via the differential 35 to the axle sections 4 and 5 of the rear axle 2, but rather the transmission takes place in a first torque train from the electric machine 13 via the gearing 15 assigned thereto to the clutch 37 and from there to the left axle section 4 with the wheel 6 assigned thereto. The electric machine 14 is connected by a second torque path via the gearing 16 to the closed clutch 38, and therefore the right axle section 5 and the wheel 6 assigned thereto are driven via said clutch. Different torques of the electric machines 13, 14 make is possible for different torques to be introduced into the two axle sections 4 and 5, thus enabling torque vectoring of the rear axle 2 by means of individual wheel drive.

The two electric machines 13 and 14 and the three clutches 36, 37, 38 have control means, by means of which, when the first electric machine 13 is in operation, the first clutch 36 is closed and the second and third clutches 37, 38 are open, or, when the two electric machines 13, 14 are in operation, the first clutch 36 is open and the second and third clutches 37, 38 are closed.

The invention claimed is:

1. A drive train of a solely electrically drivable motor vehicle, comprising:
    an axle with first and second axle sections for driving first and second wheels respectively,
    a differential having an input gear and first and second outputs connected respectively to the first and second axle sections,
    first and second electric machines interacting respectively with first and second gearings,
    a first switchable clutch selectively connecting the first gearing to the input gear of the differential for driving first and second axle sections of the axle,
    second clutch selectively connecting the first gearing to the first axle section of the axle, and
    a third clutch selectively connecting the second gearing to the second axle section of the axle,
    wherein the first electric machine drives the first and second axle sections in and energy saving mode when the first switchable clutch is closed, the second and third clutches are open and the second electric machine is switched off, and
    wherein the first and second electric machines independently drive the respective first and second axle sections when the second and third clutches are closed and the first clutch is open.

2. The drive train of claim 1, of the axle is a rear axle of the motor vehicle.

3. The drive train of claim 2, wherein the electric machines are arranged behind the rear axle.

4. The drive train of claim 1, wherein the drive train is a drive train of a sports car.

5. The drive train of claim 1, wherein the two electric machines and the three clutches have controls configured so that when the first electric machine is in operation, the first clutch is closed and the second and third clutches are open, or, when the first and second electric machines are in operation, the first clutch is open and the second and third clutches are closed.

6. The drive train of claim 1, wherein the gearings are spur gearings.

7. The drive train of claim 1, wherein the gearings have identical transmission ratios.

8. The drive train of claim 1, wherein the electric machines are arranged transversely with respect to a direction of travel of the motor vehicle.

9. The drive train of claim 1, wherein the first and second axle sections have propeller shafts.

10. The drive train of claim 5, wherein the controls are configured to transmit different torques from the first and second electric machines for achieving torque vectoring to the respective first and second wheels.

\* \* \* \* \*